United States Patent

Uehara et al.

[11] Patent Number: 5,411,218
[45] Date of Patent: May 2, 1995

[54] BEARING TYPE DRAG MECHANISM FOR FISHING REEL

[75] Inventors: Masayuki Uehara; Hiroshi Hashimoto; Tadashi Furubayashi, all of Tokyo, Japan

[73] Assignee: Daiwa Seiko, Inc., Tokyo, Japan

[21] Appl. No.: 83,170

[22] Filed: Jun. 29, 1993

[30] Foreign Application Priority Data

| Jul. 2, 1992 | [JP] | Japan | 4-197479 |
| Jul. 2, 1992 | [JP] | Japan | 4-197480 |
| Jul. 2, 1992 | [JP] | Japan | 4-197481 |

[51] Int. Cl.⁶ .............. A01K 89/027; A01K 89/033
[52] U.S. Cl. ..................... 242/245; 242/246; 242/268; 242/290; 242/271; 242/303; 188/83; 192/45
[58] Field of Search .......... 242/244, 245, 246, 264, 242/268, 285, 290, 301, 270, 271, 302, 303; 188/80, 83, 381; 192/7, 8 R, 44, 45, 65

[56] References Cited

U.S. PATENT DOCUMENTS

| 1,670,197 | 5/1928 | Humfrey | 192/45 |
| 1,901,714 | 3/1933 | Vincent | 192/45 X |
| 3,557,921 | 1/1971 | Takada | 192/45 |
| 4,462,490 | 7/1984 | Hattori | 192/45 X |
| 4,582,188 | 4/1986 | Seiz et al. | 188/83 X |
| 4,804,150 | 2/1989 | Takeuchi | 188/83 X |
| 5,035,309 | 7/1991 | Takada | 192/45 |
| 5,109,964 | 5/1992 | Fukui et al. | 192/45 X |
| 5,211,273 | 5/1993 | Castens | 192/45 |
| 5,221,057 | 6/1993 | Yoshikawa | 188/82.84 |
| 5,222,582 | 6/1993 | Castens | 192/44 |
| 5,285,985 | 2/1994 | Sakaguchi | 242/299 X |

FOREIGN PATENT DOCUMENTS

| 60-7761 | 1/1985 | Japan . |
| 60-156967 | 10/1985 | Japan . |
| 62-64280 | 4/1987 | Japan . |
| 62-164774 | 10/1987 | Japan . |
| 63-151760 | 10/1988 | Japan . |
| 63-43902 | 11/1988 | Japan . |

*Primary Examiner*—Daniel P. Stodola
*Assistant Examiner*—Michael R. Mansen
*Attorney, Agent, or Firm*—Longacre & White

[57] ABSTRACT

A drag mechanism for a fishing reel having a spool shaft supported at both the ends thereof. The drag mechanism employs rolling members as drag members so that the durability of the mechanism is enhanced, and the dragging function thereof is kept stable and good for a long time even under severe conditions under which sea water, sand or the like is likely to cling to the mechanism. One of drag member holders is secured to the spool of the reel so as to be rotated together with the spool. The other of the holders is secured to the spool shaft so as to be rotated together therewith. The tapered outside circumferential surface of one of the holders faces the tapered inside circumferential surface of the other of them. The rolling members are fitted in between the tapered surfaces. The drag mechanism can be used to drag the reverse rotation of the spool by frictional resistances to the rolling and sliding of the rolling members.

21 Claims, 8 Drawing Sheets

BEARING TYPE DRAG MECHANISM FOR FISHING REEL

BACKGROUND OF THE INVENTION

The present invention relates to a bearing type drag mechanism for a fishing reel, in which a drag force is produced using a rolling member.

In a conventional drag mechanism as a spool braking unit for a double bearing type fishing reel, a drag plate made of a lining material or the like is pushed onto a drive gear on a rotary drive shaft on a handle to apply a frictional resistance to the gear to drag the rotation of a spool, as disclosed in the Japanese Utility Model Unexamined Publication No. Sho. 60-7761 or is pushed onto a spool itself to apply a frictional resistance thereto to drag the rotation of the spool, as disclosed in the Japanese Utility Model Unexamined Publication No. Sho. 60-156967.

The Japanese Utility Model Unexamined Publication Nos. Sho. 63-151760 and Sho. 62-164774 disclose a conventional drag mechanism of another type, which is used in a rear drag type spinning reel. In the drag mechanism, a plurality of drag plates, each made of a lining material are pushed to each other between an outer periphery of a spool shaft and an inner periphery of an hollow portion of a reel body to apply a frictional resistance to the spool shaft.

The Japanese Utility Model Unexamined Publication No. Sho. 62-64280 discloses a conventional drag mechanism for a front drag type spinning reel, in which a plurality of drag plates, each made of a lining material or the like are pushed to each other between a spool shaft and a spool to a frictional resistance to the spool.

However, these conventional drag mechanisms suffers from the following problems: Since the fishing reels having the conventional drag mechanisms are used under severe conditions under which sea water, sand, garbage or the like is likely to cling to the reels, it is likely that the efficiency of the dragging or braking by the mechanisms is deteriorated, or the drag plates undergo corrosion to decrease in strength or durability to make it impossible to keep a stable dragging function for a long time.

SUMMARY OF THE INVENTION

The present invention was made in order to solve the above-mentioned problems. Accordingly, it is an object of the invention to provide a drag mechanism which is used for any kind of a fishing reel and is capable of always stably dragging or braking the rotation of a spool even under severe conditions under which water, sand, garbage or the like is likely to cling to the reel.

In order to attain the above-noted and other objects, the present invention provides a drag mechanism for a fishing reel having a first member and a second member rotatable relative to the first member. The drag mechanism includes: a first holder non-rotatively provided on the first member and formed with a substantially conical outer circumferential surface; a second member non-rotatively provided on the second member and formed with a substantially conical inner circumferential surface, the inner circumferential surface facing the outer circumferential surface in parallel relation thereto; rolling members held between the first and second holders so as to contact with both the inner and outer circumferential surfaces; and interlocking means for causing the rolling members to produce a frictional force and interlocking the first holder with the second holder through the frictional force.

The interlocking means preferably includes a spring for biasing one of said first and second holders toward the other so that said rolling member is pinched between said inner and outer circumferential surfaces. The interlocking means may further include a retainer for positioning said rolling members and maintaining a predetermined angular relationship of said rolling members with respect to a common rotational axis of the first and second holders. The interlocking means may further includes an engagement portion engageable with each of said rolling members for restricting a movement of each of the rolling members relative to the outer and inner surfaces. The drag mechanism may further includes a modulation means for modulating the frictional force.

The drag mechanism according to the invention can be incorporated into any kind of fishing reel, such as a fishing reel having a spool shaft constituting the first member and a spool rotatably mounted on the spool shaft and constituting the second member, a fishing reel having a spool shaft constituting the second member and a spool rotatably mounted on the spool shaft and constituting the first member, a fishing reel having a drive shaft constituting the first member and a drive gear rotatably mounted on the drive shaft and constituting the second member, and a fishing reel having a reel body constituting the second member and a spool shaft rotatably fitted in the reel casing and constituting the first member.

DETAILED DESCRIPTION OF THE PREFERRED EMBODIMENTS

Embodiments of the present invention are hereafter described with reference to the drawings attached hereto.

Figure 1:
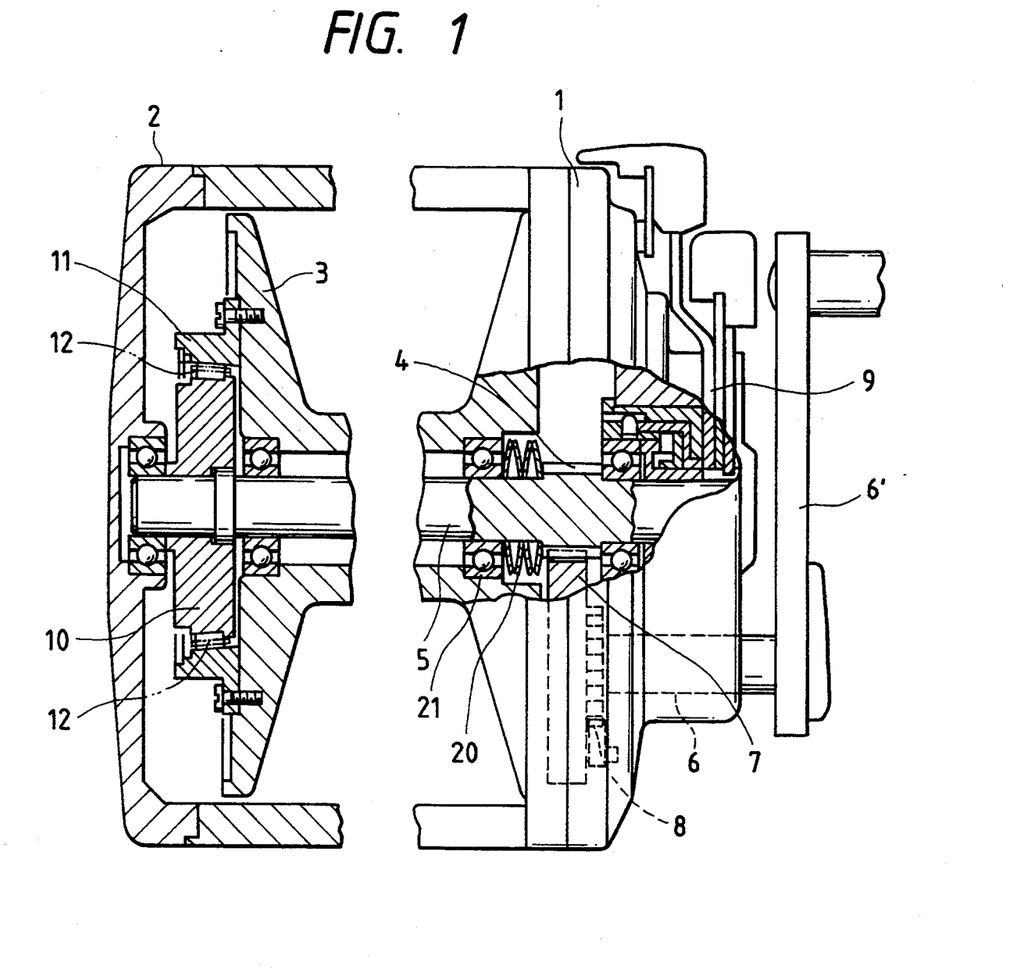
FIG. 1 is a cutaway front view of a fishing reel having a drag mechanism which is an embodiment of the present invention.
Figure 2:
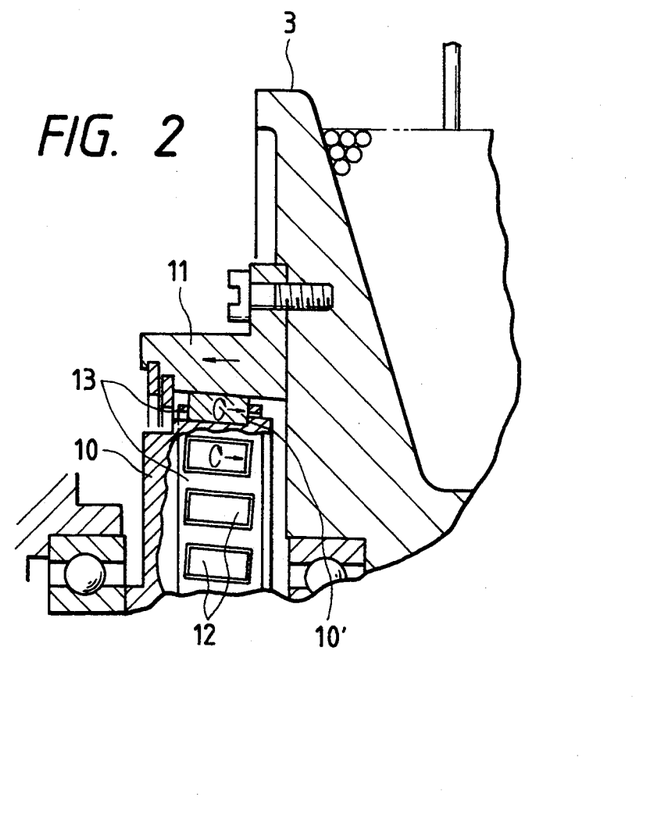
FIG. 2 is a cutaway view of a major part of the reel.
Figure 3:
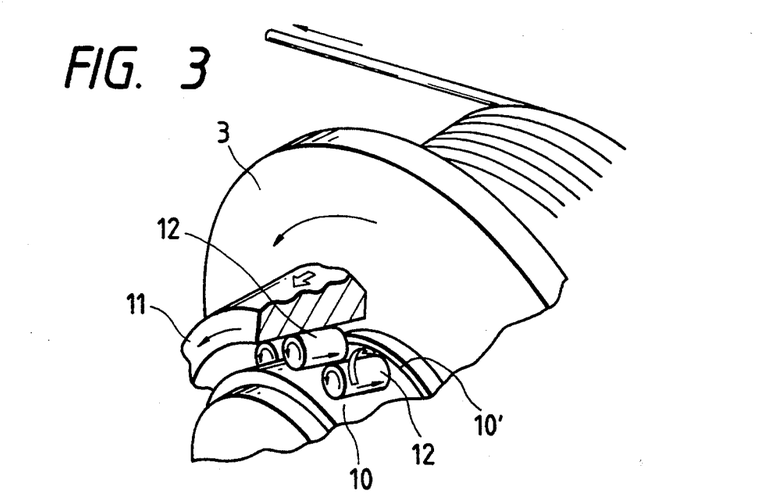
FIG. 3 is a view to illustrate the dragging action in the drag mechanism shown in FIG. 1.

FIGS. 1, 2 and 3 show a drag mechanism which is one of the embodiments and is for a fishing reel having a spool shaft 5 supported at both the ends thereof onto a reel body. The reel includes side plates 1 and 2, a spool 3, a pinion 4, the spool shaft 5, a rotary drive shaft 6, a handle 6', a drive gear 7, a reverse rotation preventer 8, a dragging force controller 9, a pair of drag member holders 10 and 11, cylindrical rolling members 12, and a retainer 13. The drag mechanism includes the reverse rotation preventer 8, the dragging force controller 9, the drag member holders 10 and 11, the cylindrical rolling members 12, and the retainer 13.

The spool 3 is rotatably supported with the spool shaft 5 between the side plates 1 and 2. The pinion 4 is formed on the spool shaft 5, and engaged with the drive gear 7 secured to the rotary drive shaft 6 coupled with the handle 6' supported by the side plate 1. The reverse rotation preventer 8 can be used to prevent the drive gear 7 from being reversely rotated. The dragging force controller 9 is provided outside the side plate 1. The dragging force controller 9 is used to push the spool shaft 5 toward the side plate 2 utilizing a cam mechanism as disclosed in Japanese utility Model Examined Publication No. Sho. 63-43902 so that the spool 3 is pushed toward the side plate 2 through a spring means 20 and a bearing 21. The drag member holder or inner race member 10 having a tapered or conical outside circumferential surface is non-rotatably but slidably fitted on the spool shaft 5 at a location near the side plate 2 so as to be rotated together with the shaft 5. The other drag member holder or outer race member 11 having a tapered or conical inside circumferential surface is secured to the spool 3 at a location near the side plate 2, and surrounds the former drag member holder 10 so that an annular tapered gap is defined between both the holders by the tapered outside and inside circumferential surfaces which are parallel to each other. The cylindrical rolling members 12 are fitted at intervals in the retainer 13 between the holders 10 and 11, and disposed in contact therewith. As best shown in FIG. 2, the retainer 13 holds each rolling member 12 to maintain a predetermined angular relationship between a rotational axis of each rolling member 12 and a common rotational axis of the drag member holders 10 and 11. In other word, the rotational axis of each rolling member 12 is not parallel to and does not intersect with the axis of the drag member holders 10 and 11.

When the spool 3 is reversely rotated by the tension of a fishline along with the unwinding thereof as the reverse rotation of the spool shaft 5 remains prevented by the reverse rotation preventer 8 on the drive gear 7, the reverse rotation of the spool 3 is dragged or braked because the axis of each of the rolling members 12 extends obliquely at angles to the axis of the spool shaft 5 or to the axis of the drag members 10 and 11, as shown in FIGS. 2 and 3, so that the rolling members roll and move in directions shown by arrows in FIGS. 2 and 3, due to a taper screw action, but the axial movement of the rolling members is restricted by the engagement portion 10' of the drag member holder 10 to interlock the rolling members between the drag member holders 10 and 11, thereby producing frictional resistances to drag or brake the reverse rotation of the spool 3. When the tension exceeds the produced frictional resistances, the spool 3 together with the drag member holder 11 is slightly moved against a biasing force of the spring means 20 toward the side plate 1 or the rolling members 12 are slightly moved toward the side plate 2, so that the rolling members 12 permits the mutual rotation of the drag member holders 10 and 11 while producing the frictional resistances in conjunction with the sliding and rotating movement thereof. The dragging force controller 9 functions to change the axial location of the drag member holder 11 relative to the drag member holder 12 and the biasing force of the spring means 20 to alter the annular tapered gap, i.e. the distance between the outer and inner circumferential surfaces of the holders 10 and 11 to increase or decrease the frictional resistances to the rolling and sliding of the rolling members 12 to modulate the force of the dragging.

Figure 4:
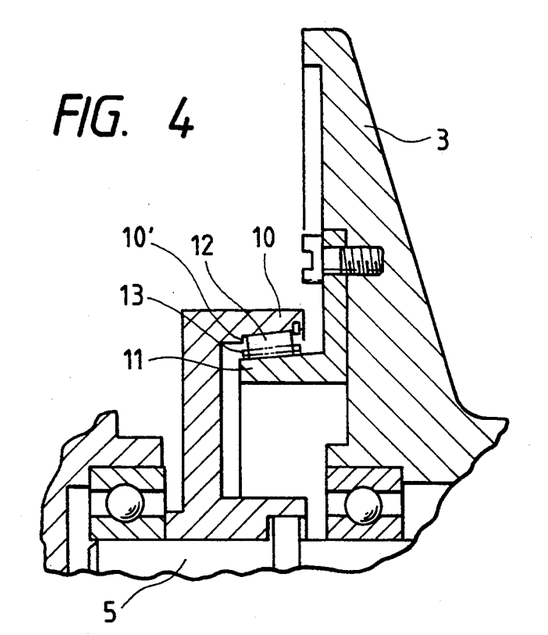
FIG. 4 is a cutaway front view of a drag mechanism which is a modification of the embodiment.

FIG. 4 shows a drag mechanism which is a modification of the embodiment described above. In the mechanism, a drag member holder 10 is provided on a spool shaft 5, another drag member holder 11 is secured to a spool 3 and surrounded by the former holder, and cylindrical rolling members 12 are fitted in between the tapered inside circumferential surface of the former holder 10 and the tapered outside circumferential surface of the latter holder 11.

Figure 5:
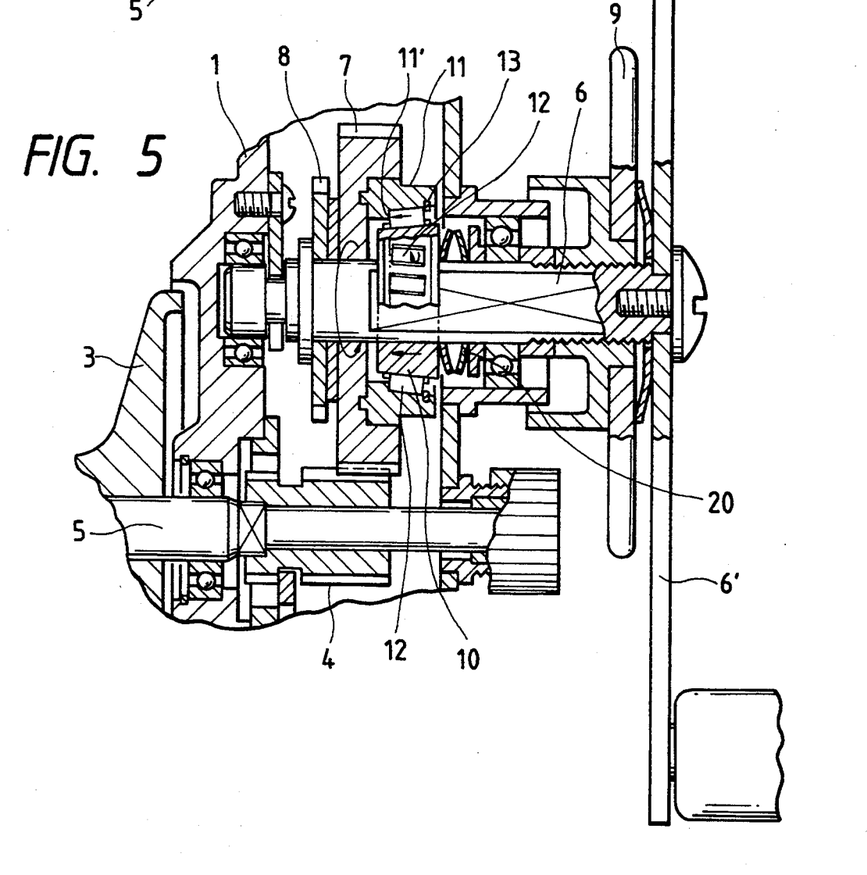
FIG. 5 is a cutaway front view of a fishing reel having a drag mechanism which is another embodiment of the invention.

FIG. 5 shows a drag mechanism which is another of the embodiments and is for a fishing reel having a spool shaft 5 supported at both the ends thereof. The reel includes a side plate 1, a spool 3, a pinion 4, the spool shaft 5, a rotary drive shaft 6, a handle 6', a drive gear 7, a reverse rotation preventer 8, a dragging force controller 9, a pair of drag member holders 10 and 11, cylindrical rolling members 12, and a retainer 13. The drag mechanism includes the reverse rotation preventer 8, the dragging force controller 9, the drag member holders 10 and 11, the cylindrical rolling members 12, and the retainer 13.

The drag member holder 10 is mounted on the rotary drive shaft 6 so as to be rotated together therewith but movable relative thereto in the axial direction of the holder. The other drag member holder 11 having an engagement portion 11' is secured to the drive gear 7 mounted on the drive shaft 6, and surrounds the former holder 10 so that a tapered annular gap is defined between both the holders 10 and 11. The reverse rotation of the rotary drive shaft 6 can be prevented by the reverse rotation preventer 8. The dragging force controller 9 is provided at the outer end of the drive shaft 6. The cylindrical rolling members 12 are fitted in the retainer 13 between the holders 10 and 11. The reverse rotation of the spool 3 can be dragged by the drag mechanism in the same manner as the preceding embodiment. The axial location of the holder 10 and the biasing force of the spring means 20 can be changed by the dragging force controller 9 to modulate the force of the dragging.

Figure 6:
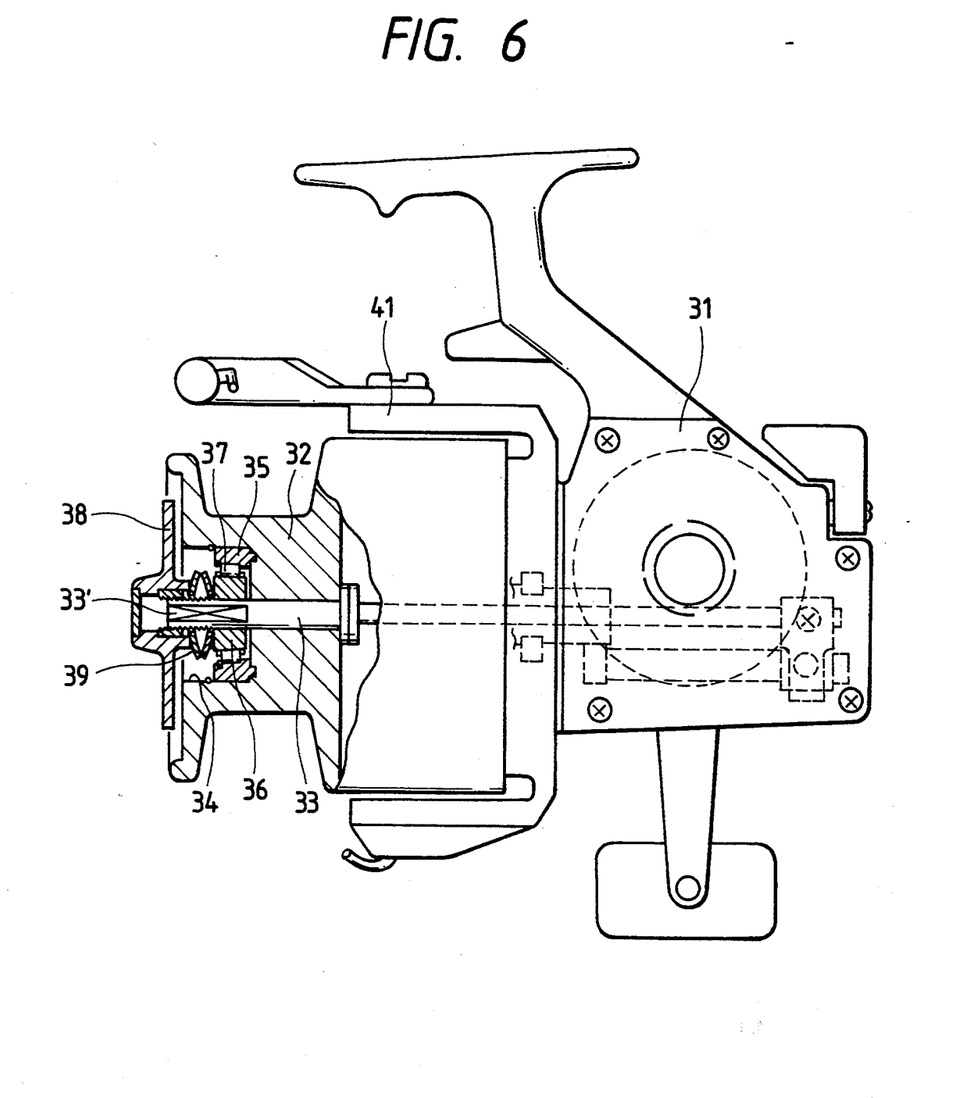
FIG. 6 is a cutaway front view of a fishing reel having a drag mechanism which is yet another embodiment of the invention.
Figure 7:
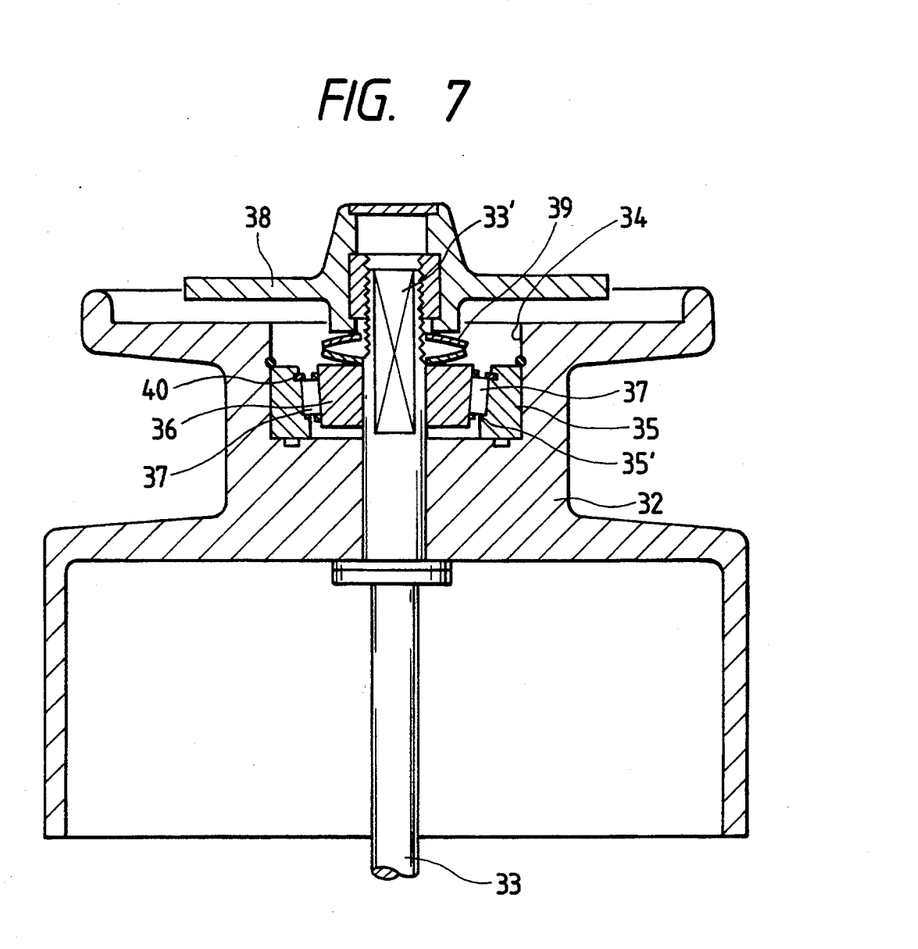
FIG. 7 is a longitudinal sectional view showing a major part of the drag mechanism shown in FIG. 6.
Figure 8:
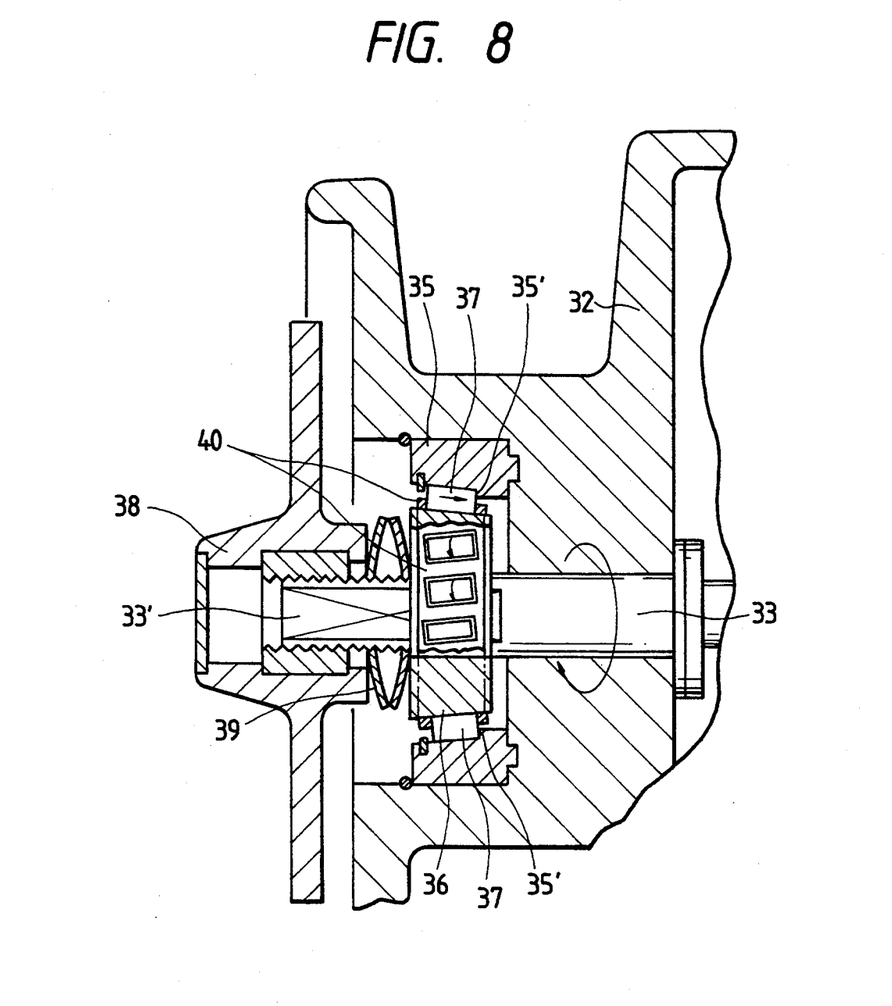
FIG. 8 is a view to illustrate the dragging action in the drag mechanism shown in FIG. 6.

FIGS. 6, 7 and 8 show a drag mechanism which is yet another embodiment and is for a spinning reel of a front drag type. The reel includes a casing 31, a spool 32, a spool shaft 33, drag member holders 35 and 36, cylindrical rolling members 37, a dragging force control knob 38, plate springs 39, a retainer 40 for the rolling members, and a rotor 41. The drag mechanism includes the drag member holders 35 and 36, the rolling members 37, the dragging force control knob 38, the plate springs 39, and the retainer 40.

The spool shaft 33 is supported by the casing 31 so that the shaft is not rotatable but slidable in the axial direction thereof. The spool 32 is rotatably supported by the shaft 33 at the front end thereof. The drag member holder 35 having a tapered inside circumferential surface and an engagement portion 35' is secured in the recess 34 of the front portion of the spool 32. The cross section of the front end portion 33' of the spool shaft 33 is shaped as a partially cut circle. The other drag member holder 36 having a tapered outside circumferential surface is fitted on the front end portion 33' of the shaft 33 so that the holder can be moved in the axial direction thereof, the tapered outside circumferential surface faces the tapered inside circumferential surface of the former holder 35, and a tapered annular gap is defined between the surfaces which are parallel to each other. The cylindrical rolling members 37 are fitted in the retainer 40 between the surfaces, and disposed in contact therewith. The dragging force control knob 38 is screw-engaged with the front end portion 33' of the spool shaft 33 so that the plate springs 39 are interposed between the knob and the holder 36. The axial location of the holder 36 is set by the knob 8 through the springs 39. The former holder 35 may be integrally formed on the spool 32.

When the spool 32 is reversely rotated by the tension of a fishline along with the unwinding thereof and the action of the rotor 41, the reverse rotation of the spool secured to the drag member holder 35 is dragged because the axis of each of the cylindrical rolling members 37 fitted in between the tapered inside circumferential surface of the holder 35 and the tapered outside circumferential surface of the other drag member holder 36 extends obliquely at angles to the axis of the spool shaft 33, as shown in FIG. 8, so that the rolling members roll and move in directions shown by arrows in FIG. 8, due to a taper screw action, but the axial movement of the rolling members is restricted by the engagement portion 35' of the holder 35 to apply frictional resistances to the rolling and sliding of the rolling members to drag the reverse rotation of the spool in the same manner as described in connection with the former embodiments. The axial location of the holder 36 can be changed by the dragging force control knob 38 to alter the tapered annular gap between the holders 35 and 36 to increase or decrease the frictional resistances to the rolling and sliding of the rolling members 37 to modulates the force of the dragging.

Figure 9:
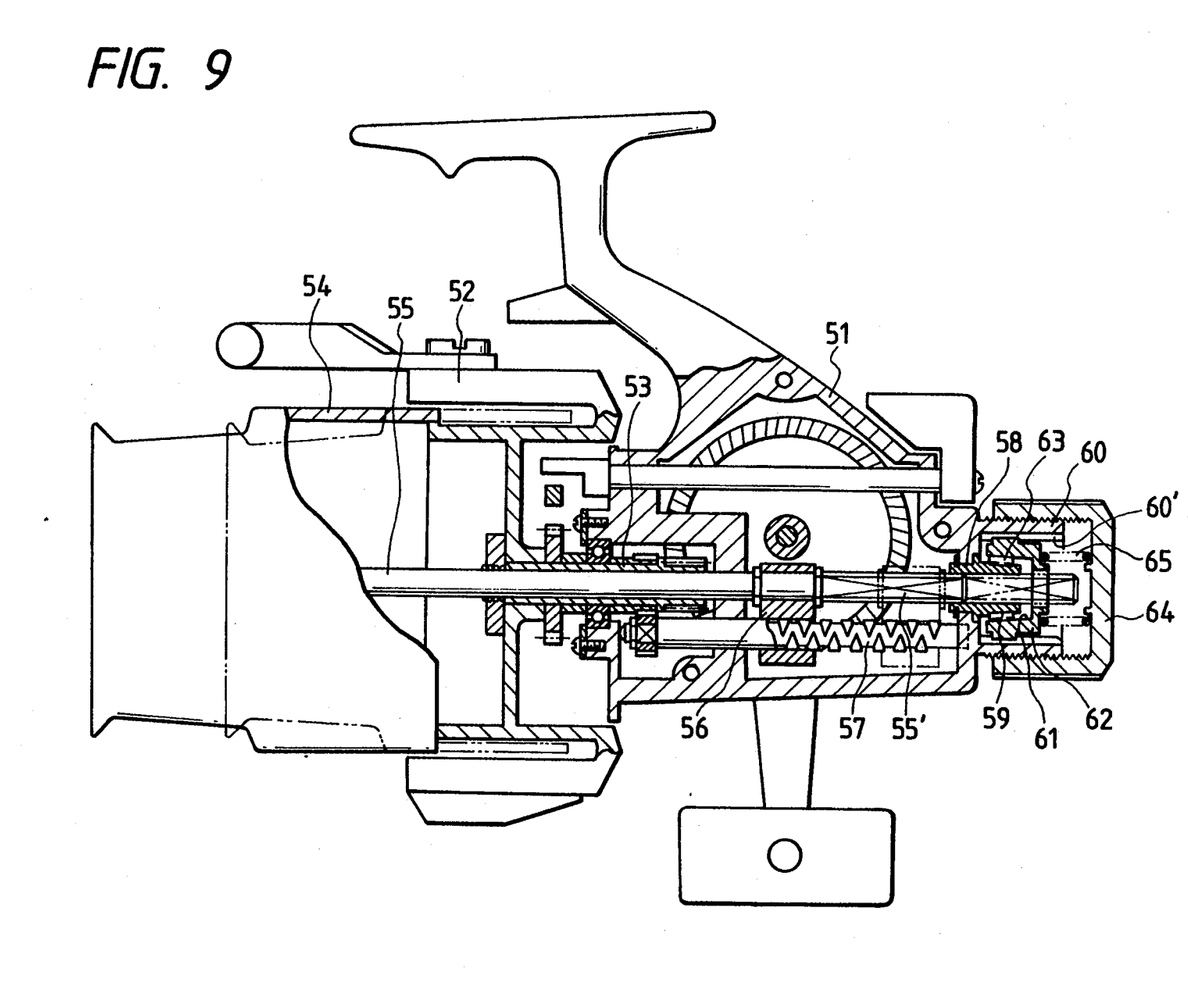
FIG. 9 is a cutaway front view of a fishing reel having a drag mechanism which is yet another embodiment of the invention.
Figure 10:
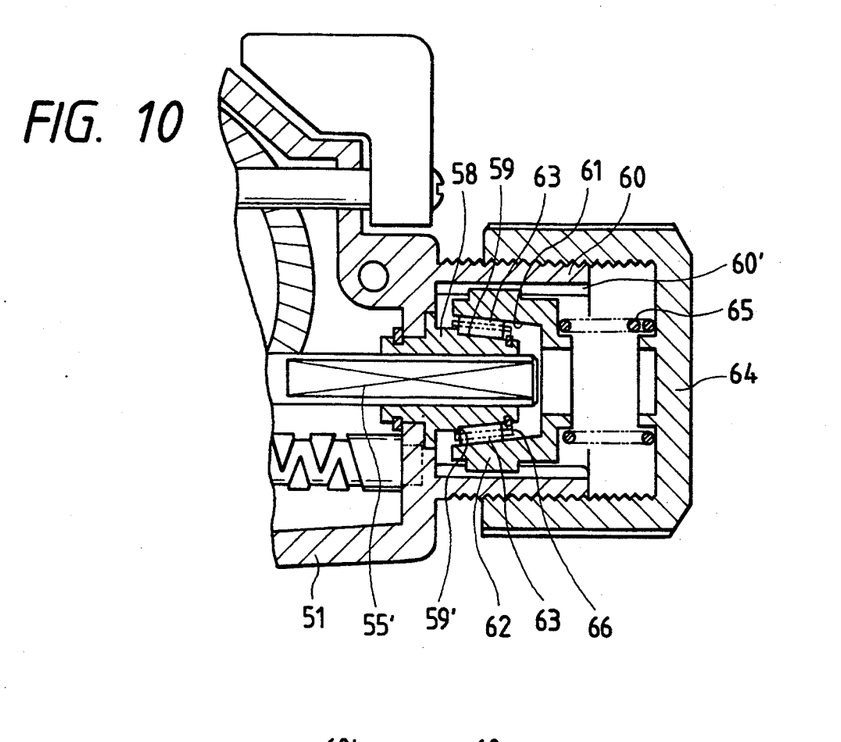
FIG. 10 is a cutaway view of a major part of the drag mechanism shown in FIG. 9.
Figure 11:
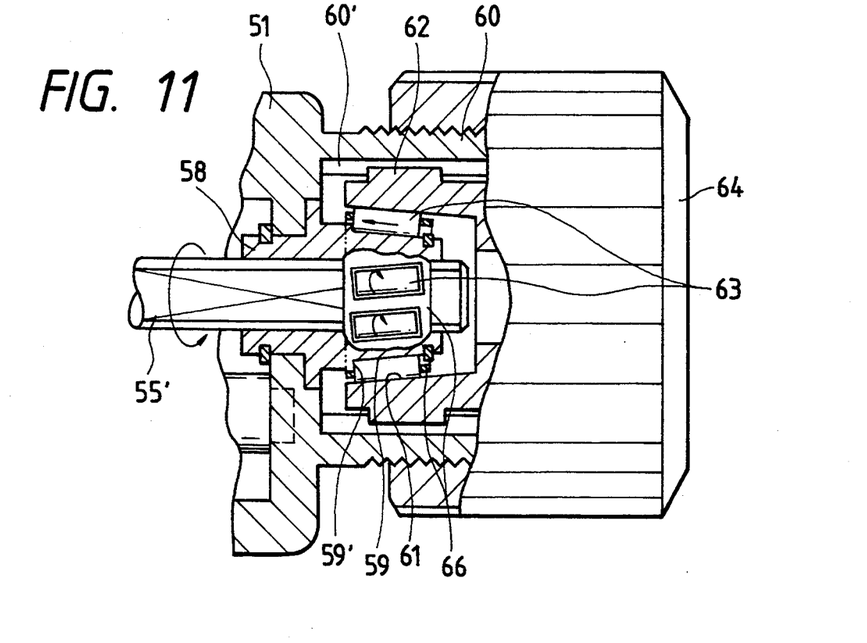
FIG. 11 is a view to illustrate the dragging action in the drag mechanism shown in FIG. 9.

FIGS. 9, 10 and 11 show a drag mechanism which is yet another embodiment and is for a spinning reel of a rear drag type. The reel includes casing 51, a rotor 52, a quill 53, a spool 54, a spool shaft 55, a slider 56, a reciprocating cam shaft 57, a rotary member 58, a non-rotary member 62, cylindrical rolling members 63, a dragging force control knob 64, a spring 65, and a retainer 66 for the rolling members. The drag mechanism includes the rotary member 58, the non-rotary member 62, the cylindrical rolling members 63, the dragging force control knob 64, the spring 65, and the retainer 66.

The rotor 52 is mounted on the quill 53 rotatably supported by the casing 51 at the front portion thereof. The spool 54 is secured to the spool shaft 55 at the front end thereof. The spool shaft 55 is rotatably and slidably fitted in the quill 53. The slider 56 is rotatably fitted on the spool shaft 55 in the casing 51, and engaged in the reciprocating cam shaft 57, which is rotated together with the quill 53 by turning a handle shaft. When the rotor 52 is rotated by the turning of the handle shaft, the spool shaft 55 is reciprocated backward and forward through the action of the slider 56 and the reciprocating cam shaft 57. At that time, a fishline is wound on the spool 54.

The cross section of the rear portion 55' of the spool shaft 55 is shaped as a partially cut circle. The portion 55' is non-rotatively fitted in the rotary member 58 so that the spool shaft 55 is movable in the axial direction thereof relative to the member 58. The rotary member 58 is rotatably supported by the rear portion of the casing 51. The rear portion of the rotary member 58 has a tapered outside circumferential surface 59, and an engagement part 59'. The rear portion of the casing 51 has a cylindrical part 60 constituting the rear end of the casing and having projections 60' extending on the inside circumferential surface of the part along the axis thereof. The non-rotary member 62 is supported in the cylindrical part 60 and engaged with the projections 60' thereof so that the member is only movable in the axial direction thereof, and the tapered inside circumferential surface 61 of the member 62 faces the tapered outside circumferential surface 59 of the rotary member 58. The cylindrical rolling members 63 are fitted in the retainer 66 between the tapered surfaces 59 and 61, and disposed in contact therewith. The dragging force control knob 64 is screw-engaged with the outside circumferential surface of the cylindrical part 60 so that the knob can be turned to be moved back or forth to change the axial location of the non-rotary member 62 relative to the rotary member 58 under the action of the spring 65.

When the spool 54 is reversely rotated together with the spool shaft 55 by the tension of the fishline along with the unwinding thereof, the reverse rotation is dragged because the axis of each of the cylindrical rolling member 63 fitted in between the tapered outside circumferential surface 59 or the rotary member 58, which is reversely rotated together with the spool shaft 55, and the tapered inside circumferential surface 61 of the non-rotary member 62 extends obliquely at angles to that of the spool shaft, as shown in FIG. 11, so that the rolling members roll and move in directions shown by arrows in FIG. 11, due to a taper screw action, but the axial movement of the rolling members is restricted by the engagement part 59' of the rotary member to apply frictional resistances to the rolling and sliding of the rolling members to drag the reverse rotation of the spool shaft. To increase or decrease the frictional resistances to the rolling and sliding of the rolling members 63 to modulate the force of the dragging, the dragging force control knob 64 is moved backward or forward to change the axial location of the non-rotary member 62 to alter the tapered annular gap between the tapered circumferential surfaces 59 and 61.

As mentioned above, the drag mechanism according to the invention can be incorporated in any kind of the fishing reel, such as a double bearing type fishing reel, a front drag type spinning reel, and a rear drag type spinning reel, in such a manner that one of the holders is secured to or formed in a first member and the other of the holders is secured to or formed in a second member the reverse rotation of which relative to the first member is dragged or braked so that rolling members are interposed in a tapered annular gap between mutually facing circumferential surfaces of the holders. The drag mechanism of the invention functions stably, smoothly and securely to drag or brake the reverse rotation of the second member utilizing frictional resistances to the rolling and sliding of the rolling members, even under sever conditions under which sea water, sand, garbage or the like is likely to cling to the components of the fishing reel. Even if an extraneous substance enters in between the drag member holders, the substance is removed by the slip action of the rolling member. The drag mechanism is thus enabled to keep a stable and efficient dragging function.

What is claimed is:

1. A drag mechanism for a fishing reel having a first member rotatably supported on a reel casing and a second member rotatable relative to the first member about a rotational axis, said drag mechanism comprising:
   a first holder non-rotatively provided on said first member and formed with a substantially conical outer circumferential surface;
   a second holder non-rotatively provided on said second member and formed with a substantially conical inner circumferential surface, said inner circumferential surface facing said outer circumferential surface in parallel relation thereto;
   rolling members held between said first and second holders and contactable with both said inner and outer circumferential surfaces;
   interlocking means for causing said rolling members to produce a frictional force and interlocking said first holder with said second holder through said frictional force; and
   modulating means for manually modulating said frictional force.

2. The drag mechanism according to claim 1, wherein said interlocking means includes a spring for biasing one of said first and second holders toward the other so that said rolling members are pinched between said inner and outer circumferential surfaces.

3. The drag mechanism according to claim 2, wherein said first and second holders have a common rotational axis, and said interlocking means further includes a retainer for positioning said rolling members and maintaining a predetermined angular relationship of said rolling members with respect to said common rotational axis.

4. The drag mechanism according to claim 3, wherein each of said rolling member has a rotational axis, and said predetermined angular relationship is defined such that said common rotational axis is not parallel to and does not intersect with said rotational axis of each of said rolling members.

5. The drag mechanism according to claim 3, wherein each of said rolling members is movable relative to said inner and outer circumferential surfaces in a first direction in conjunction with a rotation thereof, and said interlocking means further includes an engagement portion engageable with each of said rolling members for restricting said movement.

6. The drag mechanism according to claim 1, wherein said fishing reel includes a spool shaft constituting said first member and a spool rotatably mounted on said spool shaft and constituting said second member.

7. The drag mechanism according to claim 6, wherein one of said first and second holders is movable relative to the other of said first and second holders in an axial direction of said spool shaft.

8. The drag mechanism according to claim 1, wherein said fishing reel includes a spool shaft constituting said second member and a spool rotatably mounted on said spool shaft and constituting said first member.

9. The drag mechanism according to claim 8, wherein one of said first and second holders is movable relative to the other of said first and second holders in an axial direction of said spool shaft.

10. The drag mechanism according to claim 1, wherein said fishing reel includes a drive shaft constituting said first member and a drive gear rotatably mounted on said drive shaft and constituting said second member.

11. The drag mechanism according to claim 10, wherein one of said first and second holders is movable relative to the other of said first and second holders in an axial direction of said drive shaft.

12. The drag mechanism according to claim 1, wherein said fishing reel includes a reel casing constituting said second member and a spool shaft rotatably fitted in said reel casing and constituting said first member.

13. The drag mechanism according to claim 12, wherein one of said first and second holders is movable relative to the other of said first and second holders in an axial direction of said spool shaft.

14. The drag mechanism according to claim 1, wherein said modulating means is adapted to move one of said first and second holders relative to the other of said first and second holders in an axial direction of said rotational axis.

15. The drag mechanism according to claim 1, wherein said first holder is adapted to translate relative to said first member in an axial direction of said rotational axis.

16. The drag mechanism according to claim 1, wherein said modulating means is adapted to move said first member relative to said second holder.

17. The drag mechanism according to claim 1, wherein said modulating means is adapted to adjust a location of said first holder relative to said first member in an axial direction of said rotational axis.

18. A drag mechanism for a fishing reel having a spool shaft and a spool means rotatable relative to the spool shaft member about a rotational axis and adapted to receive fishline thereon, said drag mechanism comprising:
   a first holder non-rotatively provided on said spool shaft and formed with a substantially conical outer circumferential surface;
   a second holder non-rotatively provided on said spool means and formed with a substantially conical inner circumferential surface, said inner circumferential surface facing said outer circumferential surface in parallel relation thereto;
   rolling members held between said first and second holders and contactable with both said inner and outer circumferential surfaces;
   interlocking means for causing said rolling members to produce a frictional force and interlocking said first holder with said second holder through said frictional force; and
   modulating means for modulating said frictional force.

19. The drag mechanism according to claim 18, wherein said modulating means is adapted to move one of said first and second holders relative to the other of said first and second holders in an axial direction of said rotational axis.

20. A drag mechanism for a fishing reel having a first member rotatably supported on a reel casing and a second member disposed radially outside relative to the first member, said drag mechanism comprising:
   a first holder non-rotatively provided on said first member and formed with a substantially conical outer circumferential surface;
   a second holder non-rotatively provided on second member and formed with a substantially conical inner circumferential surface, said inner circumferential surface facing said outer circumferential surface in parallel relation thereto;

rolling members held between said first and second holders and contactable with both said inner and outer circumferential surfaces;

interlocking means for causing said rolling members to produce a frictional force and interlocking said first holder with said second holder through said frictional force; and modulating means for manually modulating said frictional force, wherein said first holder is adapted to slide relative to said first member in an axial direction of said rotational axis.

21. The drag mechanism according to claim 20, wherein said second member is fixed with respect to said reel casing.

* * * * *